(12) United States Patent
Souvignier et al.

(10) Patent No.: US 6,499,011 B1
(45) Date of Patent: Dec. 24, 2002

(54) METHOD OF ADAPTING LINGUISTIC SPEECH MODELS

(75) Inventors: Bernd Souvignier, Aachen (DE); Andreas Kellner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/395,014

(22) Filed: Sep. 13, 1999

(30) Foreign Application Priority Data

Sep. 15, 1998 (DE) .......................................... 19842151

(51) Int. Cl.[7] ........................... G10L 15/06; G10L 15/02
(52) U.S. Cl. ..................... 704/240; 704/243; 704/244; 704/251
(58) Field of Search ............................... 704/256, 255, 704/243, 257, 244, 254, 200, 231, 236, 251, 252, 240

(56) References Cited

U.S. PATENT DOCUMENTS

| | | | |
|---|---|---|---|
| 5,241,619 A | * 8/1993 | Schwartz et al. | 704/240 |
| 5,606,644 A | * 2/1997 | Chou et al. | 704/243 |
| 5,677,990 A | * 10/1997 | Junqua | 704/255 |
| 5,712,957 A | * 1/1998 | Waibel et al. | 704/240 |
| 5,737,489 A | * 4/1998 | Chou et al. | 704/256 |
| 5,835,890 A | * 11/1998 | Matsui et al. | 704/255 |
| 5,983,179 A | * 11/1999 | Gould | 704/251 |
| 6,076,057 A | * 6/2000 | Narayanan et al. | 704/256 |
| 6,185,528 B1 | * 2/2001 | Fissore et al. | 704/232 |

OTHER PUBLICATIONS

"Improved Estimation of Supervision in Unsupervised Speaker Adaptation", Shigeru Homma et al, ICASSP, pp. 1023–1026.

"A Spoken Language Inquiry System for Automatic Tain Timetable information", by Harald Aust et al, Philips J.R. 49, 1995, pp. 399–418.

"Elements of Information Theory", Thomas M. Cover et al, Entropy, Relative Entropy and Mutual Information, p. 18.

\* cited by examiner

*Primary Examiner*—Vijay Chawan
(74) *Attorney, Agent, or Firm*—Daniel J. Piotrowski

(57) ABSTRACT

Method and apparatus are disclosed for adapting linguistic speech models in automatic speech recognition systems using speech recognition results obtained during operation of such systems, in which, during the adaptation, a list of N-best recognition result alternatives with N>1 for a speech utterance to be recognized is evaluated. To improve such an on-line adaptation of the linguistic speech models, a combination of a plurality of recognition result alternatives of the list is included in the adaptation.

3 Claims, 2 Drawing Sheets

METHOD OF ADAPTING LINGUISTIC SPEECH MODELS

FIELD OF THE INVENTION

The invention relates to a method of adapting linguistic speech models in automatic speech recognition systems by means of speech recognition results obtained during operation of the systems, in which, during the adaptation, a list of N-best recognition result alternatives with N>1 for a speech utterance to be recognized is evaluated.

A corresponding on-line adaptation of speech models is particularly required in dialogue systems using automatic speech recognition. Such dialogue systems provide the possibility of, for example, speech-controlled data bank inquiries. Examples are train timetable information systems, telephone information systems, airport information systems and information systems for bank clients.

The speech recognition is performed by means of stochastic models. Both acoustic models, based on HMM models (Hidden Markov Model) and linguistic speech models which represent probability values of the occurrence of speech elements of a semantic and syntactic nature are used. Notably in dialogue systems, the problem often occurs that there is not enough training material available for training the linguistic speech models used for the speech recognition before the system is taken into operation. For this reason, it is desirable to provide an on-line adaptation in dialogue systems in which the speech recognition results obtained during operation are used for further improvement of the used linguistic speech model or for adaptation to the relevant fields of application. Such an adaptation is designated as being unsupervised because only the speech recognition result found is available to the speech recognizer, rather than safe information about the actually provided speech utterance.

DESCRIPTION OF PRIOR ART

It is known from S. Homma et al, "Improved Estimation of Supervision in Unsupervised Speaker Adaptation", ICASSP 1997, pp. 1023–1026 to use the best recognition result alternative, i.e. the one having the greatest probability, only for the on-line adaptation in the case of unsupervised on-line adaptation of linguistic speech models from a list of N-best recognition result alternatives defined for a speech utterance, when the difference between this probability and the probability of the second best recognition result alternative exceeds a given predetermined threshold value.

SUMMARY OF THE INVENTION

It is an object of the invention to improve the on-line adaptation of the linguistic speech models.

This object is solved in that a combination of a plurality of recognition result alternatives of the list is included in the adaptation.

This has the advantage that a compensation is created for those cases where the element of the list of N-best recognition result alternatives evaluated as the best recognition result alternative does not correspond to the actually provided speech utterance. This will be regularly represented by at least another recognition result alternative of the list. By combining a plurality of recognition result alternatives of the list in accordance with the invention, an error-reducing compensation is achieved in such cases, which eventually leads to an improved on-line adaptation regarding linguistic speech modeling.

Particularly when recognizing sequences of single speech elements, which are combined to a speech utterance, the invention benefits from the fact that single speech elements of the actual speech utterance may not be represented in the best recognition alternative but with great probability in at least one of the other list elements of the list of N-best recognition result alternatives. In on-line adaptation, such parts of recognition result alternatives are not ignored but taken into account with a given weight. Furthermore, in cases where speech elements are represented in the best recognition result alternative of the list of N-best recognition result alternatives, which speech elements were not part of the actual speech utterance, it is very probable that such speech elements are not represented in the other list elements. Here, too, the fact that further list elements are taken into account provides a compensation for an error which would occur when only the best list element were taken into account.

The inventive idea is realized in that, in the combination of recognition result alternatives of the list, probability values assigned to these alternatives are weighted with a given numerical value, and an adaptation weight for a recognition result alternative used for the adaptation is formed in that the weighted probability value assigned to this recognition result alternative is related to the sum of the weighted probability values assigned to the other recognition result alternatives of the list. This implementation, which can easily be realized and leads to satisfactory adaptation results, is made more concrete in that the adaptation weights are defined in accordance with the formula $$\omega_i = \frac{l_i^\lambda}{\sum_{j=1}^{N} l_j^\lambda}$$

in which $\omega_i$ is the adaptation weight relating to the $i^{th}$ element of the list of N-best recognition result alternatives, and $l_i$ is the probability value of the $i^{th}$ element of the list of N-best recognition result alternatives. The weight $\lambda$ can be determined heuristically for each case. When the probability values $l_i$ are present in a logarithmic form, this formulation has the advantage that the involution with the weight $\lambda$ changes over to a multiplication by this weight.

The invention relates to a speech recognition system wherein a linguistic speech model used for speech recognition is adapted in accordance with any one of the methods described above.

BRIEF DESCRIPTION OF THE DRAWING

These and other aspects of the invention are apparent from and will be elucidated with reference to the embodiment(s) described hereinafter.

In the drawings.

DETAILED DESCRIPTION OF THE PREFERRED EMBODIMENTS

Figure 1:
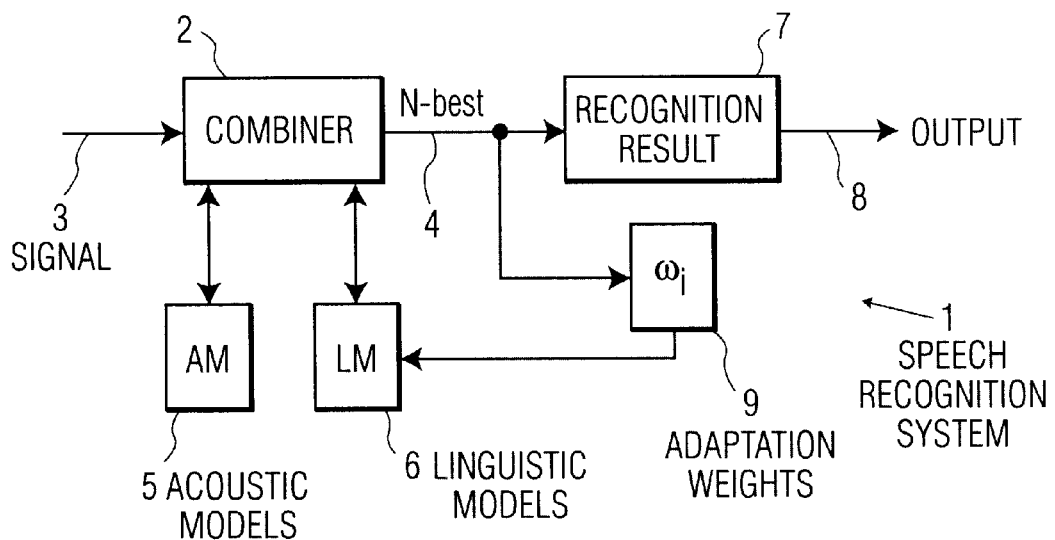
FIG. 1 shows the basic structure of a speech recognition system according to the invention.

The speech recognition system 1 shown in FIG. 1 has a function block 2 combining modules of the speech recognition system 1 and receiving characteristic vectors representing speech signals at the input (reference numeral 3). These speech signals are generated by sampling and quantizing speech signals which are present in an electric form and by subsequently dividing them into consecutive, partly overlapping frames for which a Cepstral analysis is performed which eventually yields the components of the characteristic vectors applied to the function block 2. The function block 2 represents a probability maximization in accordance with the known Bayes rule and supplies, at the output (reference numeral 4), N-best recognition result alternatives with N>1 for which the largest probability values were determined. The operation in accordance with function block 2 generally includes stochastic speech models which were trained before putting the speech recognition system 1 into operation. On the one hand, these are acoustic models (function block 5) and, on the other hand, also linguistic speech models (function block 6). So-called HMM models are used for acoustic modeling. In linguistic speech modeling, occurrence probability values are assigned to single elements or also combinations of elements of a speech vocabulary.

In a function block 7, a recognition result is generated at its output 8, which result corresponds to that element of the list of N-best recognition result alternatives to which the highest probability was assigned.

The relevant list of N-best recognition result alternatives present at the output 4 is also used for on-line adaptation of the linguistic speech model 6. To this end, adaptation weights $\omega_i$ defined by the formula $$\omega_i = \frac{l_i^\lambda}{\sum_{j=1}^{N} l_j^\lambda}$$

are determined (function block 9), wherein $\omega_i$ is the adaptation weight relating to the $i^{th}$ element of the list of N-best recognition result alternatives, and $l_i$ is the probability value of the $i_{th}$ element of the list of N-best recognition result alternatives.

The weight $\lambda$ is a heuristically determined numerical value which is to be redetermined for each application. The associated frequencies of occurrence, from which the probability values of occurrence of the linguistic speech model (function block 6) are calculated, are increased by the adaptation weights $\omega_i$ thus determined, so that the occurrence probability values are weighted with a corresponding given numerical value.

Figure 2:
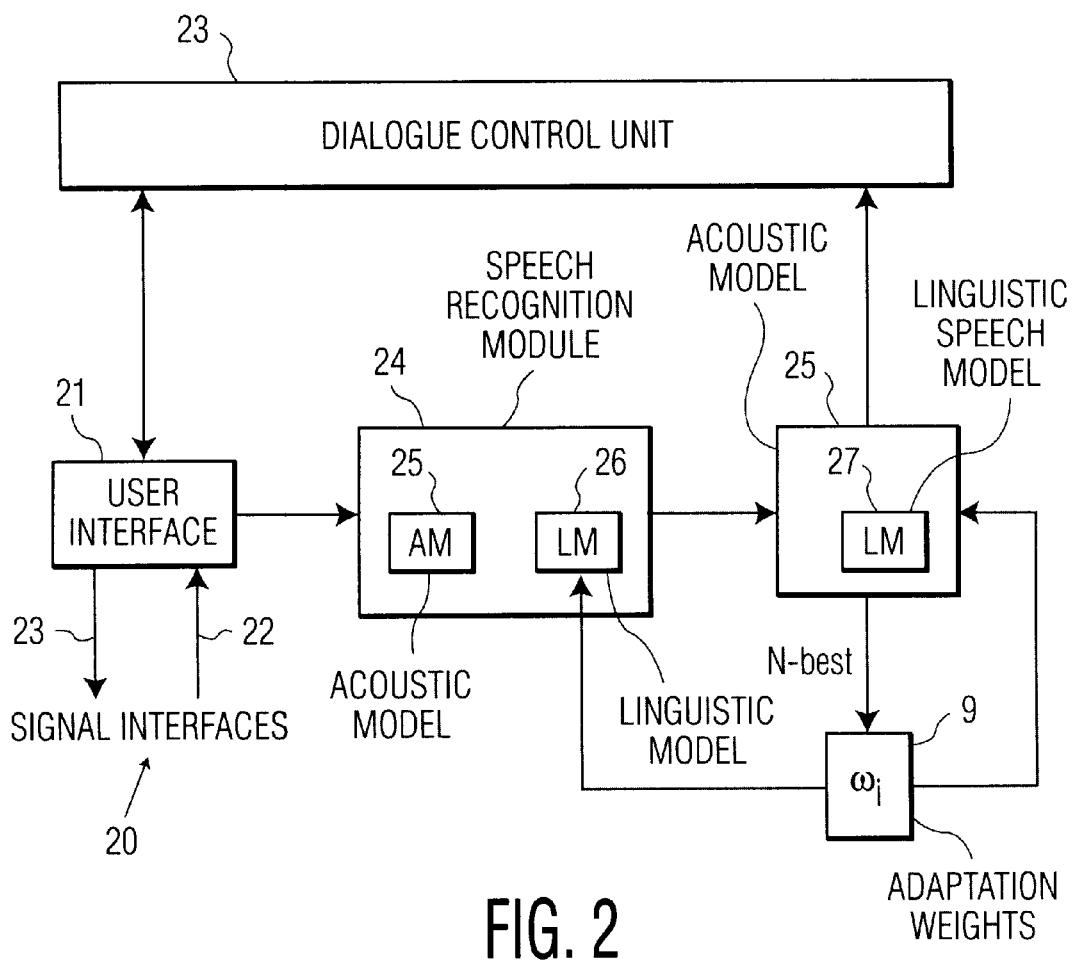
FIG. 2 shows a dialogue system using automatic speech recognition according to the invention.

FIG. 2 shows a dialog system 20 in accordance with the invention which may be used, for example, in systems for train timetable information, telephone information, airport information or also in information systems for bank clients. Speech utterances (reference numeral 22) to be evaluated are applied to the system via a user interface 21. As a reply of the system 20 to a received speech utterance, speech signals at the output 23, generated by means of a dialogue control unit 23, can be supplied via the user interface 21 to a user as a reply to a speech input.

Figure 3:
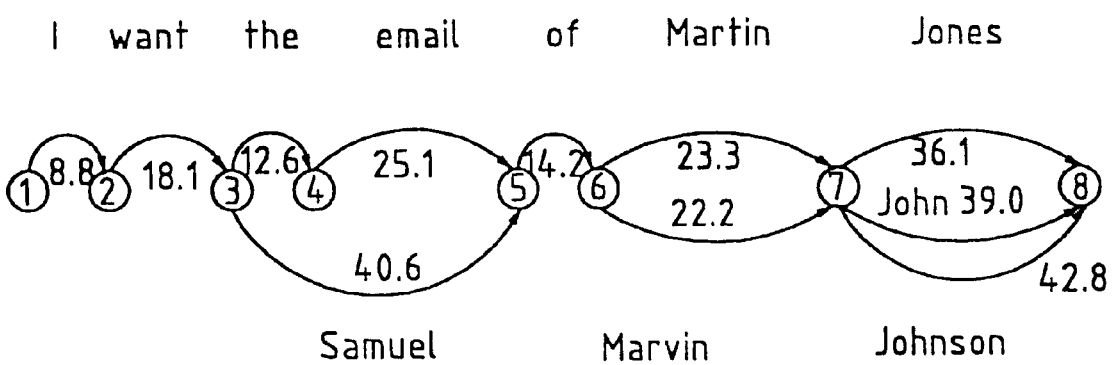
FIG. 3 shows an example of a word graph.

The user interface 21 supplies speech signals which are present in an electric form to a speech recognition module 24 in which acoustic models 25 and linguistic models 26 are integrated. As regards the operation of the acoustic models 25, reference is made to the description of FIG. 1. In contrast to FIG. 1, the speech recognition module 24 does not supply a list of N-best recognition result alternatives but a word graph whose nodes correspond to instants and whose edges correspond to single words of a speech utterance. Occurrence probability values for the relevant word are assigned to the separate edges. The linguistic speech models represented by the function block 26 are used for focusing each word graph supplied by the function block 24, i.e. as compared with a word graph generated only on the basis of the acoustic models 25 used, a word graph supplied by the function block 24 does not comprise those recognition alternatives which, on the basis of the associated occurrence probability values in accordance with the linguistic model 26, can be considered as recognition results with only a small probability. An example of a word graph is shown in FIG. 3. This word graph has eight nodes. The probability values assigned to the separate edges are provided as negative natural logarithms of the relevant occurrence probability.

The word graphs generated by the speech recognition module 24 are analyzed as regards their sensible contents by a speech comprehension module 25. Here again, a linguistic speech model denoted by the reference numeral 27 is used. This model comprises, in this case, a grammar speech modeling, a filler word speech modeling and a concept speech modeling. Fillers are used for modeling those parts of the word graphs that are not included in concepts. Concepts are understood to mean sensible categories of parts of speech utterances. Their concrete contents are the so-called attributes. Further information on the structure of the speech comprehension module 25 or the linguistic speech modeling in accordance with function block 27 can be read in the thesis by Harald Aust et al, "A Spoken Language Inquiry System for Automatic Train Timetable Information", Philips J. R. 49, 1995, pp. 399–418.

The linguistic speech models represented by the function blocks 26 and 27 comprise probabilities of occurrence of linguistic speech elements which, in accordance with the formulation explained in FIG. 1, are subjected to an on-line adaptation. Here again, adaptation weights $\omega_i$ in accordance with the formula described above are determined from a list of N-best recognition result alternatives. The list of N-best recognition result alternatives is supplied by the speech comprehension module 25 in dialog system 20. The adaptation of the occurrence probability values combined by the linguistic speech models 26 and 27 by means of the adaptation weights $\omega_i$ is performed in the way as described above.

During operation of the dialog system 20, the speech comprehension module 25 supplies the best recognition result alternative to the dialog control unit which thereupon provides, via the user interface 21, a speech output to the user, which speech output is provided in dependence upon its relevant use as a reaction to such a recognition result.

What is claimed is:

1. A method of adapting linguistic speech models in automatic speech recognition systems, the method comprising the steps of:
    receiving speech recognition results during the operation of the systems; and
    evaluating a list of best recognition result alternatives for a speech utterance to be recognized wherein a combination of a plurality of recognition result alternatives of the list is included in the adaptation, wherein in the combination of recognition result alternatives of the list, probability values assigned to these alternatives are weighted with a given numerical value, and an adaptation weight for a recognition result alternative used for the adaptation is formed in that the weighted probability value assigned to this recognition result alternative is related to the sum of the weighted probability values assigned to the other recognition result alternatives of the list.

2. The method as claimed in claim 1, wherein the adaptation weights are defined in accordance with the formula $$\omega_i = \frac{l_i^\lambda}{\sum_{j=1}^{N} l_j^\lambda}$$

in which $\omega_i$ is the adaptation weight relating to the $i^{th}$ element of the list of N-best recognition result alternatives, and $l_i$ is the probability value of the $i^{th}$ element of the list of N-best recognition result alternatives.

3. A speech recognition system wherein a linguistic speech model used for speech recognition is adapted, the system comprising: a processor configured to receive speech recognition results and to evaluate a list of best recognition result alternatives for a speech utterance to be recognized wherein a combination of a plurality of recognition result alternatives of the list is included in the adaptation, wherein in the combination of recognition result alternatives of the list, probability values assigned to these alternatives are weighted with a given numerical value, and an adaptation weight for a recognition result alternative used for the adaptation is formed in that the weighted probability value assigned to this recognition result alternative is related to the sum of the weighted probability values assigned to the other recognition result alternatives of the list.

* * * * *